(12) United States Patent
Mukaide et al.

(10) Patent No.: US 8,797,729 B2
(45) Date of Patent: Aug. 5, 2014

(54) CONNECTING COMPONENT FOR CONNECTING A DISPLAY PANEL TO A CABINET

(75) Inventors: Masayoshi Mukaide, Kyoto (JP); Ren Jie Gao, Shenzhen (CN); Guo Li, Shenzhen (CN); Yu Ning Peng, Shenzhen (CN)

(73) Assignees: Sanyo Electric Co., Ltd., Osaka (JP); Sanyo Technology Center (Shenzhen) Co., Ltd., Shenzhen, Guangdon Province (CN)

( * ) Notice: Subject to any disclaimer, the term of this patent is extended or adjusted under 35 U.S.C. 154(b) by 110 days.

(21) Appl. No.: 13/476,696

(22) Filed: May 21, 2012

(65) Prior Publication Data
US 2012/0229968 A1  Sep. 13, 2012

Related U.S. Application Data

(63) Continuation-in-part of application No. PCT/JP2010/070473, filed on Nov. 17, 2010.

(30) Foreign Application Priority Data

Nov. 20, 2009 (JP) ................................. 2009-265474

(51) Int. Cl.
*G06F 1/16* (2006.01)
*G02F 1/1333* (2006.01)

(52) U.S. Cl.
USPC .................. 361/679.21; 361/679.24; 349/58; 349/60

(58) Field of Classification Search
USPC .................... 349/58–60; 361/679.01–679.45, 361/679.55–679.59; 312/223.1, 223.2
See application file for complete search history.

(56) References Cited

U.S. PATENT DOCUMENTS

| | | | | |
|---|---|---|---|---|
| 6,633,276 | B1 * | 10/2003 | Jaynes | 345/158 |
| 7,447,001 | B2 * | 11/2008 | Chen | 361/600 |
| 7,561,423 | B2 * | 7/2009 | Turusaki et al. | 361/679.21 |
| 2005/0174726 | A1 * | 8/2005 | Bang et al. | 361/681 |
| 2005/0264985 | A1 * | 12/2005 | Kim et al. | 361/681 |
| 2012/0257335 | A1 * | 10/2012 | Iwai et al. | 361/679.01 |
| 2013/0057802 | A1 * | 3/2013 | Jung | 349/58 |

FOREIGN PATENT DOCUMENTS

| | | |
|---|---|---|
| JP | 2005-286987 | 10/2005 |
| JP | 2006-133355 | 5/2006 |
| JP | 2008-141606 | 6/2008 |

* cited by examiner

*Primary Examiner* — Nidhi Desai
(74) *Attorney, Agent, or Firm* — McDermott Will & Emery LLP

(57) ABSTRACT

The instant application describes a display device including a display panel; a cabinet configured to house the display panel; a spacer disposed inside of the cabinet between a back wall of the cabinet and a back portion of the display panel; and a fastening component configured to secure the back wall of the cabinet to the back portion of the display panel by penetrating through the back wall of the cabinet and the spacer and resting in an aperture provided in the back portion of the display panel.

4 Claims, 6 Drawing Sheets

CONNECTING COMPONENT FOR CONNECTING A DISPLAY PANEL TO A CABINET

CROSS-REFERENCE TO RELATED APPLICATIONS

This application is a continuation-in-part of Patent Cooperation Treaty Patent Application Number PCT/JP2010/070473, filed on Nov. 17, 2010, which claims priority from Japanese Patent Application Number 2009-265474, filed on Nov. 20, 2009, all of which are hereby incorporated by reference herein in their entirety.

TECHNICAL FIELD

The instant application relates to a connecting component for connecting a display panel to a cabinet.

BACKGROUND

A display device includes a cabinet to accommodate a display panel. In usage, the display device is installed such that its backside (e.g., the back side of cabinet) faces the wall or is attached to the wall of the indoor room. See e.g., JP2005-286987A1. When such display device is attached to the wall of the indoor room, the display device is fixed to a fixing component attached to the wall. To this end, a female screwing component is embedded in the back wall of the cabinet facing backwards. The female screwing component is configured to receive a male screwing component such as, for example, a screw penetrating through the fixing component. In this manner, the cabinet is connected to the fixing component attached to the wall.

To connect the cabinet to the display panel, on the other hand, a female screwing component different from the one described above is provided in the back part of the display panel. The female screwing component is configured to receive a male screwing component such as, for example, a screw penetrating the back wall of the cabinet to connect the cabinet to the back portion of the display panel. To this end, the back portion of the display panel is in contact with the back wall of the cabinet. As such, it is necessary to prepare various cabinets having different design (e.g., different shapes) or sizes depending on the thickness of the display panels.

Therefore, there is a need for a connecting component that allows a uniform cabinet to be employed for connecting to display panels with varying thickness.

SUMMARY

In one general aspect, the instant application describes a display device including a display panel; a cabinet configured to house the display panel; a spacer disposed inside of the cabinet between a back wall of the cabinet and a back portion of the display panel; and a fastening component configured to secure the back wall of the cabinet to the back portion of the display panel by penetrating through the back wall of the cabinet and the spacer and resting in an aperture provided in the back portion of the display panel.

The above general aspect may include one or more of the following features. The display device may further include a connecting component disposed between the back wall of the cabinet and the back portion of the display panel. The connecting components may include a first flat portion provided along the back portion of the display panel, a second flat portion provided along the back wall of the cabinet, and a third flat portion extending perpendicular to the first and second flat portions and connecting the first flat portion to the second flat portion.

The display device may be configured to be connected to a fixing component coupled to a wall. The spacer may be formed on the first flat portion and raised toward the back wall of the cabinet. The spacer may include a penetrating hole for receiving the fasting component. The second flat portion may be configured to secure the connecting component to the fixing component. The second flat portion may include a female screw component configured to be inserted into a penetrating hole provided on the back wall of the cabinet and receive a male fastening component.

The fasting component may include a screw component. The female fasting component may include a female screw component. The male fasting component may include a bolt. The spacer may include a ridge portion formed on the first flat portion. The ridge portion may be formed by bending a part of the connecting component.

In another general aspect, the instant application describes a display device including a display panel; a cabinet configured to house the display panel; a connecting component disposed inside the cabinet between a back wall of the cabinet and a back portion of the display panel. The connecting component includes a first portion provided along the back portion of the display panel, a spacer formed on the first portion and raised toward the back wall of the cabinet, the spacer including a penetrating hole, a second portion provided along the back wall of the cabinet and including a female screw component, and a third portion connecting the first portion to the second portion. The display device also includes a fastening component configured to secure the back wall of the cabinet to the back portion of the display panel by penetrating through the back wall of the cabinet and the penetrating hole of the spacer and resting in an aperture provided in the back portion of the display panel; and a penetrating hole formed in the back wall of the cabinet and configured to receive the female screw component to enable securing the back wall of the cabinet to a fixing component coupled to a wall.

BRIEF DESCRIPTION OF THE DRAWINGS

The figures depict one or more implementations in accord with the present teachings, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without exemplary details. In other instances, well known methods, procedures, components, and/or circuitry have been described at a relatively high-level, without detail, in order to avoid unnecessarily obscuring aspects of the present concepts. In exchange for the present disclosure herein, the Applicants desire all patent rights described in the claims. Therefore, the patent rights are not intended to be limited or restricted by the following detailed description and accompanying figures.

Figure 1:
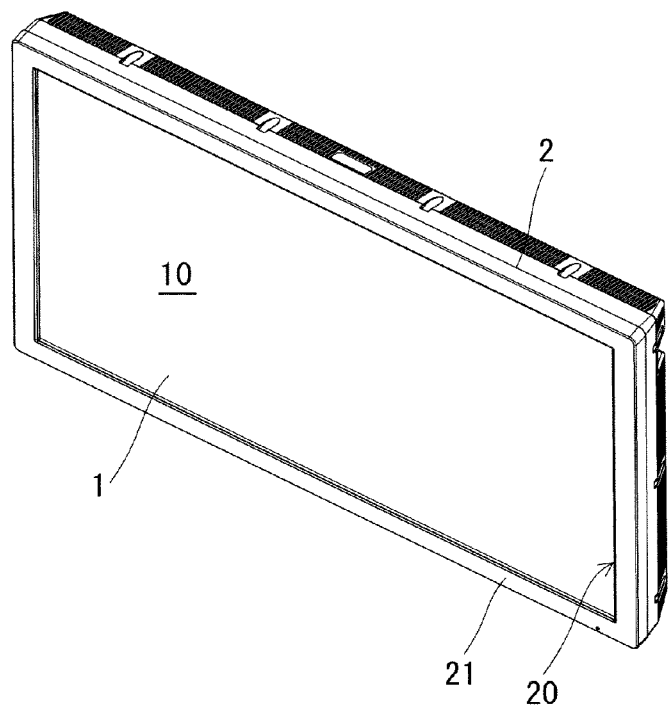
FIG. 1 illustrates an exemplary display device of the instant application.
Figure 2:
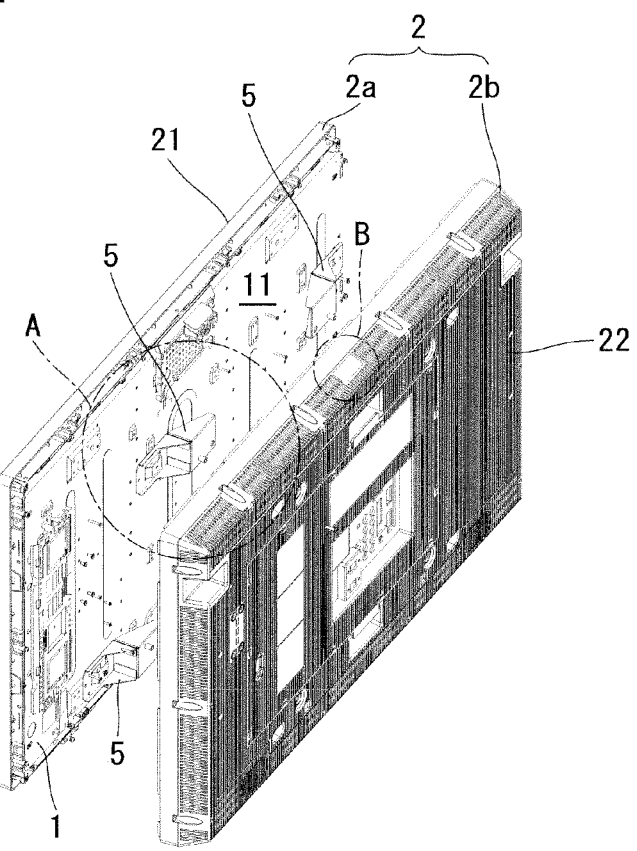
FIGS. 2 and 3 illustrate a back side view of the display device shown in FIG. 1.
Figure 3:
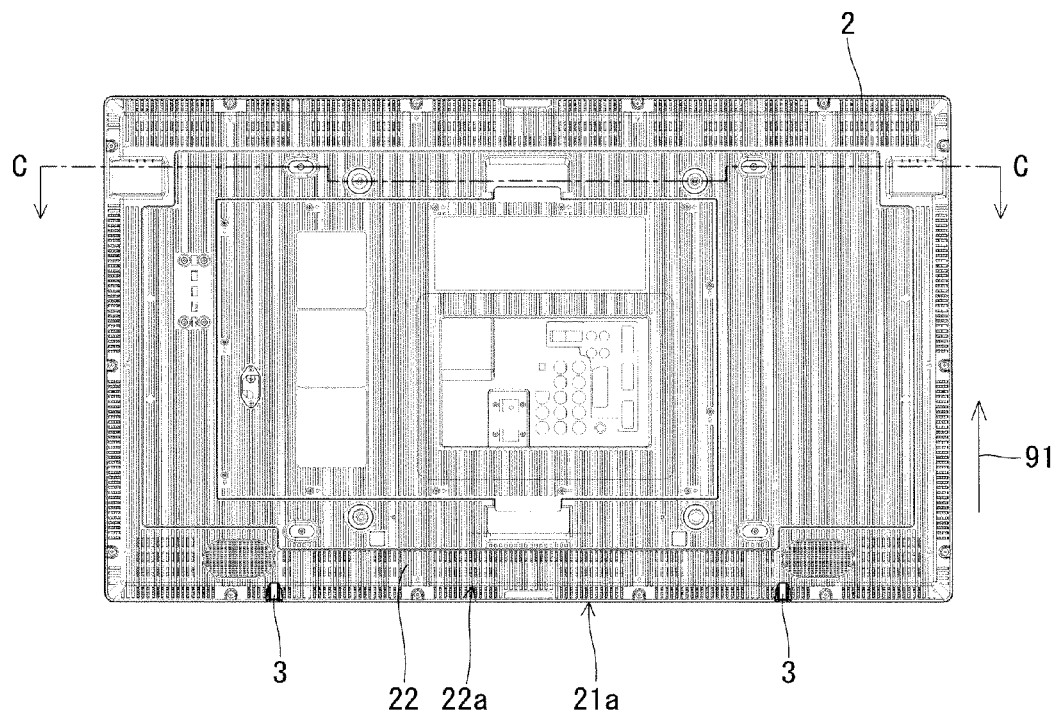

FIG. 1 illustrates an exemplary display device of the instant application. As shown, the display device includes a Liquid Crystal Display (LCD) panel (1) and a cabinet (2) for accommodating the panel (1). Referring also to FIGS. 2 and 3, the cabinet (2) includes a front wall (21) and a back wall (22). In the front wall (21) of the cabinet (2), a display window (20) is provided so as to make a screen (10) of the panel (1) viewable from the outside.

As shown in FIG. 2, the cabinet (2) is formed by jointing the front wall (21) and the back wall (22) together. Specifically, the cabinet is formed by joining a first cabinet component (2a), which is a front wall (21) of the cabinet (2) and a second cabinet component (2b), which is a back wall (22) of the cabinet (2). A displaying window (20) is provided on the first cabinet component (2a). Most of the portion of the upper wall, lower wall, left side wall and the right side wall of the cabinet (2) is formed by the second cabinet component (2b). The components (2a) and (2b) may be made by resin having a high fire retardant property such as, for example, ABS (Acrylonitrile Butadiene Styrene) resin or PC (Polycarbonate) resin.

The upper wall, lower wall, left side wall and the right side wall are slanted so that the size of the front side area of the display device becomes larger than that of the back side area. Thereby, as shown in FIG. 3, the cabinet (2) has a shape such that the lower edge (22a) of the back wall (22) is shifted in the height direction compared to bottom edge (21a) of the front wall (21).

In the outer surface of the first cabinet component (2a), a coating layer having high weather resistance and stain resistance compared to the first cabinet component (2a) may be formed. Similarly, in the outer surface of the second cabinet component (2b), a coating layer having high weather resistance and stain resistance compared to the second cabinet component (2b) may be formed. The coating layer may be formed by coating a paint having a high weather and stain resistance to the outer surface of the first cabinet components (2a, 2b). The weather resistance may mean durability against UV rays. Stain resistance may mean durability against organic solvents. As for coating material (e.g., paint), "Sutoron-ehsu" or "Asu-kouto" manufactured by Cashew Co., Ltd. may be utilized.

Figure 4:
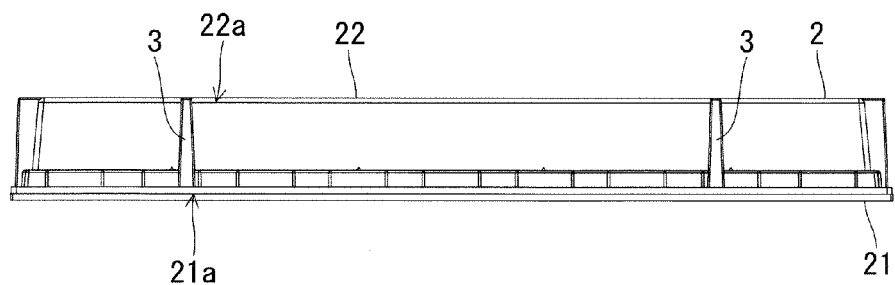
FIG. 4 illustrates a bottom view of the display device shown in FIG. 1.

FIG. 4 illustrates a bottom view of the display device shown in FIG. 1. As shown in FIG. 4, in the bottom surface of the cabinet (2), a pair of protruding portions (3) on the either side are formed extending forward from the bottom edge (22a) of the back wall (22) of the cabinet (2). The protruding portions (3) are protruding to the position facing the bottom edge (21a) of the front wall (21) or to its vicinity.

Figure 5:
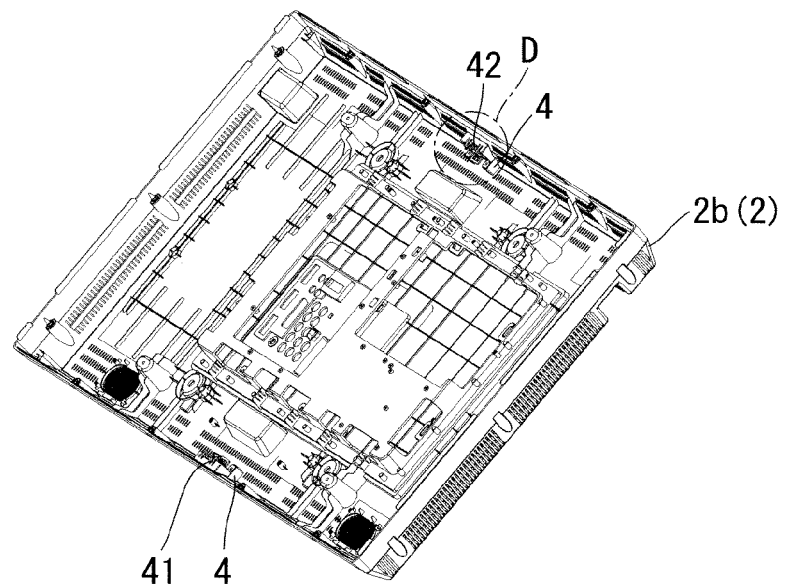
FIG. 5 illustrates inside of a cabinet of the display device shown in FIG. 1.

FIG. 5 illustrates inside of the cabinet (2) of the display device shown in FIG. 1. As shown in FIG. 5, the cabinet (2) houses a receiving sensor (41) and an information acquisition sensor (42). The receiving sensor (41) may be configured to receive a control signal from a remote controller. The information acquisition sensor (42) may be configured to acquire information about the surroundings of the display device. For example, the information acquisition sensor (42) may include a sensor for acquiring the light intensity entering the cabinet (2) or the display panel (1). For another example, the information acquisition sensor (42) may include a sensor for acquiring temperature information of the surroundings. Other alternatives are contemplated.

Figure 6:
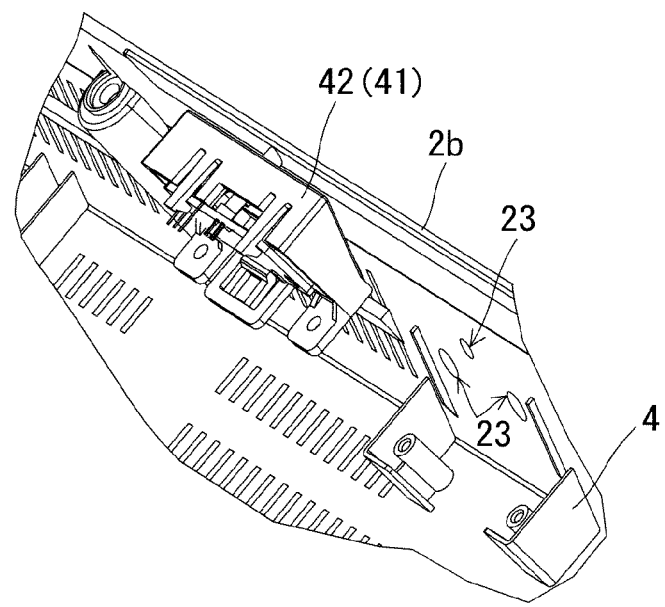
FIG. 6 illustrates an enlarged view of the area D shown in FIG. 5.

FIG. 6 illustrates an enlarged view of the area D shown in FIG. 5. The area D includes sensor mounting units (4) for housing the receiving sensor (41) and information acquisition sensor (42). The sensor mounting unit (4) is provided on an inner surface of the component (2b). In detail, as shown in FIG. 5, the sensor mounting units (4) are provided in two places on the inner surface of the component (2b). One of the sensor mounting units (4) is provided on the upper side of the inner surface of the component (2b). The other of the sensor mounting units (4) is provided on the lower side of the inner surface of the component (2b).

In this example, the information acquisition sensor (42) is housed in the sensor mounting unit (4) provided on the upper side of the inner surface of the component (2b). The receiving sensor (41) is housed in the sensor mounting unit (4) provided on the lower side of the inner surface of the component (2b). When housing the sensors (41, 42) in their respective sensor mounting units (4), a pair of screwing components may be employed to secure the sensors (41, 42) to their respective sensor mounting units (4). To this end, the sensors (41, 42) attached to the sensor mounting units (4) are replaceable.

Figure 7:
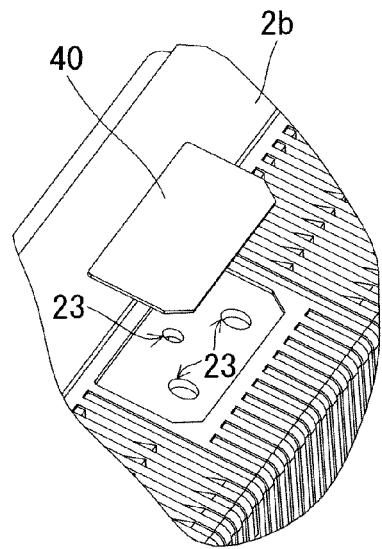
FIG. 7 illustrates an enlarged view of the area B shown in FIG. 2.

FIG. 7 illustrates an enlarged view of the area B shown in FIG. 2. The area B includes three penetrating holes (23) penetrating from inside to outside of the component (2b) in vicinity of each of the sensor mounting units (4). The penetrating holes (23) are configured to receive three screwing components for securing the sensors (41, 42) to the sensor mounting units (4). The sensors (41, 42) attach to their respective sensor mounting units (4) facing respective penetrating holes (23). In the outer surface of the second cabinet component (2b), a seal component (40) for sealing three penetrating holes (23) is attached. The seal component (40) can prevent dust and/or water from penetrating inside the cabinet (2) from the holes (23), thereby protecting the sensors (41, 42) from water and/or dust.

The display device of the instant application can be installed to a wall or a pillar in the indoors and outdoors. The display device can be installed to the wall or pillar by fixing the display device to a fixing component attached to a certain portion of the wall or pillar. This is described in more details below.

Referring again to FIG. 2, the cabinet (2) houses two pairs of connecting components (5). One pair of connecting components (5) is provided in the upper portion of the cabinet (2). The other pair of connecting components (5) is provided in the lower portion of the cabinet (2). Each pair of the connecting components includes a component in the left and a component in the right of the cabinet (2) and is for connecting to the fixing component.

Figure 8:
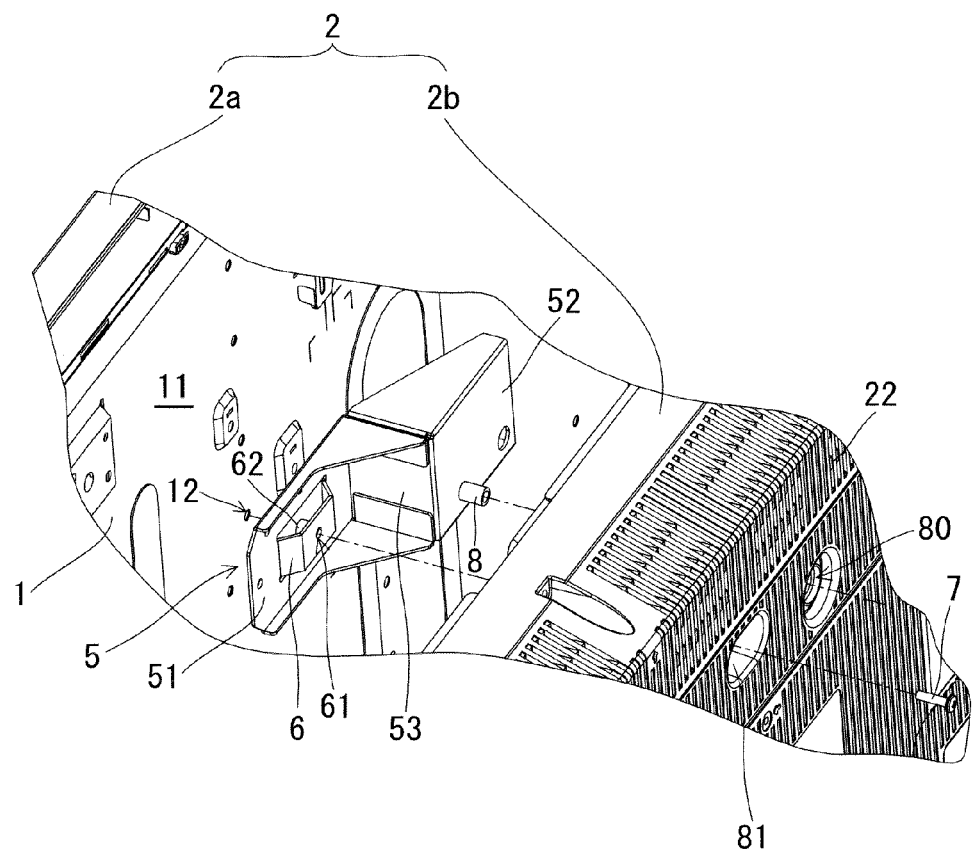
FIG. 8 illustrates an enlarged view of the area A shown in FIG. 2.
Figure 12:
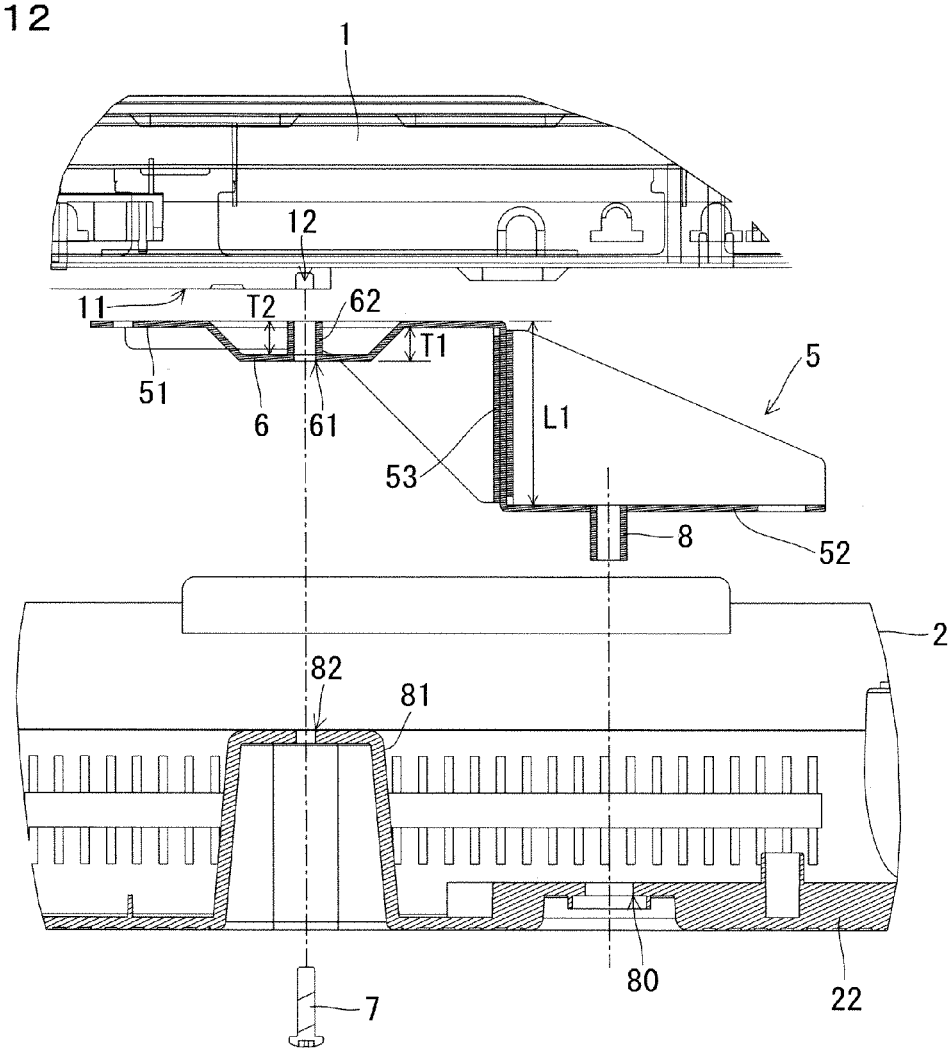
FIG. 12 illustrates an enlarged view of the E area shown in FIG. 11.

Referring also to FIGS. 8 and 12, each pair of connecting components (5) is disposed between the back wall (22) of the cabinet (2) and the back portion (11) of the display panel (1). The connecting component (5) includes a first flat portion (51) provided along the back portion (11) of the display panel (1) and a second flat portion (52) provided along the back wall (22) of the cabinet (2). The first flat portion (51) and the second flat portion (52) are formed by bending the connecting component (5) in a crank-like shape. The connecting component (5) also includes a third flat portion (53) extending perpendicular to the first and second flat portions (51, 52) and connecting the first flat portion (51) to the second flat portion (52).

The first flat portion (51) of the connecting component (5) includes a ridge portion (6). The ridge portion (6) is formed by bending a part of the flat portion (51). The ridge portion (6) is heaved toward the back wall (22) of the cabinet (2) and has a height T1. The ridge portion (6) includes a penetrating hole (61) and a cylindrical portion (62) surrounding the penetrating hole (61). The penetrating hole (61) is configured to receive a screwing component (7) for fixing the back portion (11) of the display panel (1) to the back wall (22) of the cabinet (2). The cylindrical portion (62) surrounds the penetrating hole (61) and is provided in a protruding manner.

Figure 13:
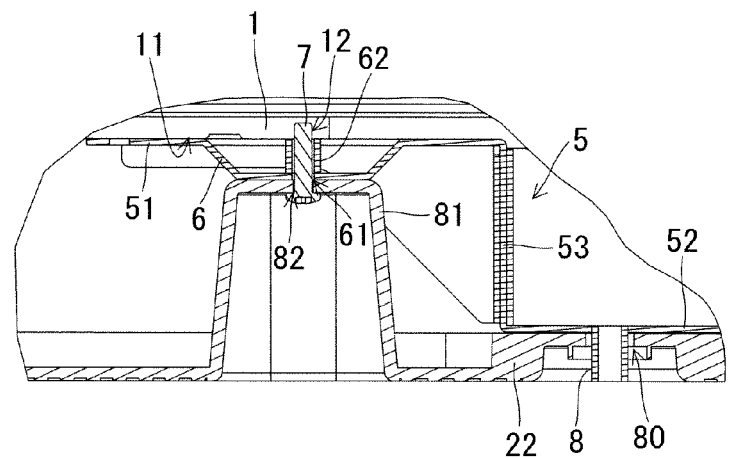
FIG. 13 illustrates an enlarged view of the E area shown in FIG. 11.

Referring specifically to FIG. 12, the cylindrical portion (62) vertically extends from the bottom of the ridge portion (6) toward the back portion (11) of the display panel (1). In one specific example, as shown in FIG. 12, the cylindrical portion (62) has a height T2. The height T2 is almost same as the height T1 of the ridge portion (6). Referring also to FIG. 13, the inner side of the cylindrical portion (62) has a shape such that a space between the inner surface of the portion (62) and the screwing component (7) exists when the component (7) is inserted in the cylindrical portion (62). As shown in FIG. 13, in the assembled state, the first flat portion (51) of the connecting component (5) contacts the back portion (11) of the LCD panel (1).

The back wall (22) of the cabinet (2) includes a ridge portion (81) heaving toward inside of the cabinet (2) in an area facing the first flat portion (51) of the connecting component (5). The ridge portion (81) may conform to each of the connecting components (5) when the display device is assembled. The ridge portion (81) includes a penetrating hole (82) at the tip of the ridge portion (81). The penetrating hole (82) is configured to receive the screwing component (7) from the cabinet (2) and pass it to the penetrating hole (61).

To this end, the ridge portion (81) formed on the back wall (22) of the cabinet (2) contacts the back side surface of the ridge portion (6). Here, the penetrating hole (61) provided on the ridge portion (6) of the first flat portion (51) and the penetrating hole (82) provided on the ridge portion (81) of the cabinet (2) face each other. In the back portion (11) of the LCD panel (1), a screw hole (12) is provided. The screw component (7) is screwed to a screw hole (12) after penetrating the penetrating holes (61, 82) respectively provided on the ridge portions (6, 81). The screw component (7) penetrating the holes (61, 82) passes through the cylindrical portion (62) and is guided smoothly to the hole (12) inside which the screw component (7) rests (e.g., screwed). In this manner, the LCD panel (1) is fixed to the cabinet (2) and is connected directly to the connecting component (5).

In the above described display device, the first flat portion (51) of the connecting component (5) contacts the back portion (11) of the LCD panel (1) and the ridge portion (81) of the cabinet (2) contacts the back side of the first flat portion (51) (e.g., the ridge portion (6)). As a result, the screwing component (7) can be screwed in a position close to the back portion (11) of the LCD panel (1). This in turn can assure a high jointing force between the LCD panel (1) and the connecting component (5).

Referring again to FIGS. 8 and 12, the second flat portion (52) of the connecting component (5) includes a female screwing portion (8). The female screwing portion (8) is configured to receive a bolt for connecting the connecting component (5) to the fixing component so as to protrude toward the back wall (22) of the cabinet (2). To this end, the back wall (22) of the cabinet (2) includes a penetrating hole (80) in an area facing the second flat portion (52) of the connecting component (5).

The penetrating hole (80) may conform to each of the connecting components (5) when the display device is assembled. The penetrating hole (80) is configured to receive the female screwing portion (8). When inserted in the penetrating hole (80), the female screwing portion (8) is exposed at the back of the cabinet (2). When fixing the display device to the fixing component, a bolt is screwed to the female screwing portion (8). In this manner, the connecting component (5) is connected to the fixing component.

In the above-described implementation, the female screwing portion (8) is exposed in the back side of the cabinet (2) penetrating the penetrating hole (80). Thus, when fixing the display device to the fixing component, the female screw portion (8) approaches the fixing component. The bolt is screwed to the portion (8) in the area near the fixing component. As result, a high jointing force can be assured between the connecting component (5) and the fixing component. By fixing the display device to the fixing component, the LCD panel (1) is connected to the fixing component via the connecting component (5). Thereby, even when the cabinet (2) deteriorates by aging and its strength decreases, the LCD panel (1) does not fall from the fixing component.

In the above-described implementation, the LCD panel (1) is connected to the connecting component (5) by the screwing component (7) which is different from the bolt. By removing the screwing component (7) from the back side of the cabinet (2), it is possible to detach the LCD panel (1) from the cabinet (2) without unlocking the connection between the connecting component (5) and the fixing device. Thus, by removing the first cabinet component (2*a*) of the cabinet (2) from the second cabinet component (2*b*), and then removing the screwing component (7), it is possible to detach the LCD panel (1) from the cabinet (2) without releasing the connection between the connecting component (5) and the fixing device.

In the above-described implementation, the ridge portion (6) formed on the first flat portion (51) of the connecting component (5) may function as a spacer intervening between the back wall (22) of the cabinet (2) and the LCD display (1). By adjusting the height T1 of the ridge portion (6) of the first flat portion (51) (i.e. thickness of the spacer), the position of the LCD panel (1) in the front-back direction can be adjusted. As a result, the cabinet (2) can accommodate LCD panels having different thickness by adjusting the height T1 of the ridge portion (6) of the first flat portion (51), by replacing the first flat portion (51) with a first flat portion have a different height T1 of the ridge portion (6), or by replacing the connecting component (5) having a different first flat portion with different height T1 of the ridge portion. Accordingly, according to the teachings of the instant application a common cabinet (2) may be employed for various panels having different thickness.

In the above-described implementation, the protruding portions (3) formed on the cabinet (2) stretch forward from the bottom edge (22*a*) of the back wall (22) of the cabinet (2) and protrude to a position facing the bottom edge (21*a*) of the front wall (21) of the cabinet (2) or to its vicinity. As a result, the edge (21a) and the tip of each of the protruding portions (3) is displaced such that they form a letter "T" of the alphabet and they align in a single plane which is substantially parallel to the height direction of the cabinet (2). Therefore, when setting the display device in a standing position, the display device is supported on a horizontal surface by the bottom edge (21a) of the front wall (21) of the cabinet (2) and a pair of protruding portion (3). As a result, the display device can stand still in a horizontal surface by a relatively small power support.

According to this aspect of the instant application, it is possible to execute maintenance or repairing while keeping the display device in a stand still position on a horizontal surface.

Figure 9:
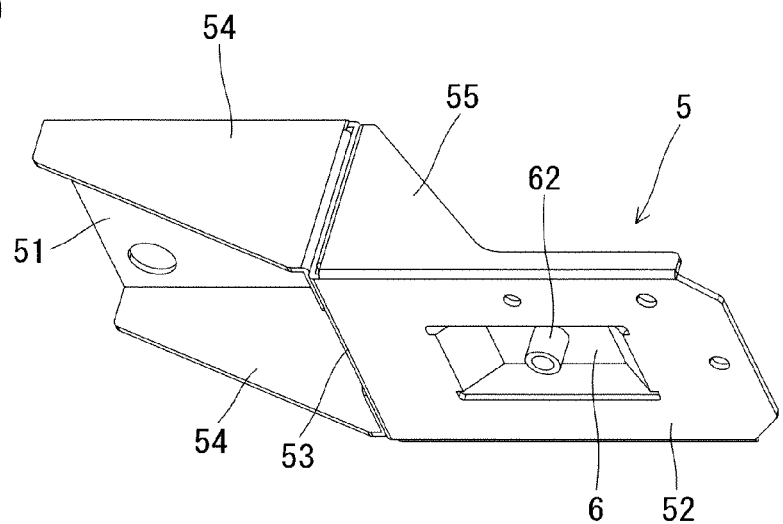
FIG. 9 illustrates an exemplary connecting component used in the display device shown in FIG. 1.
Figure 10:
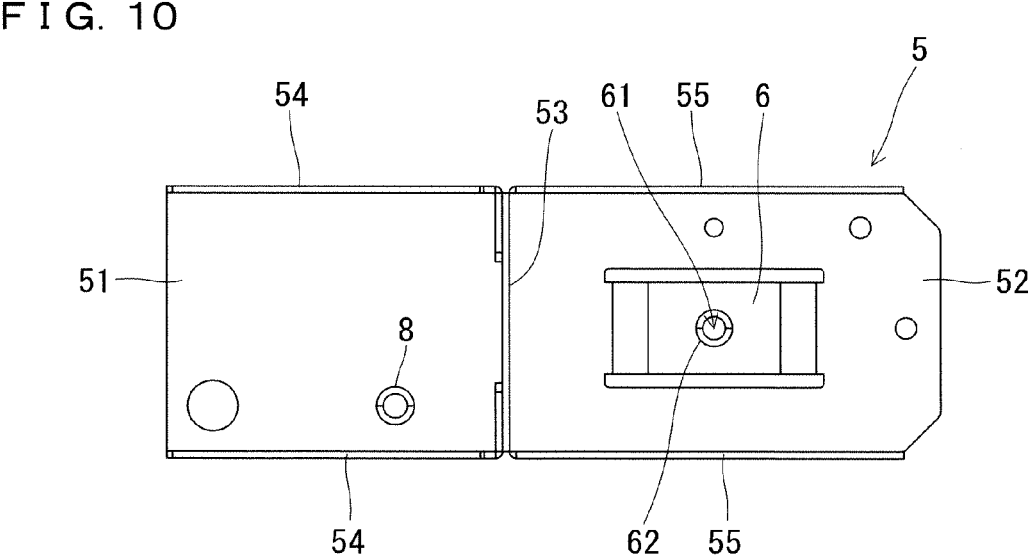
FIG. 10 illustrates a plan view of the connecting component shown in FIG. 9 when viewed from a first flat portion side.
Figure 11:
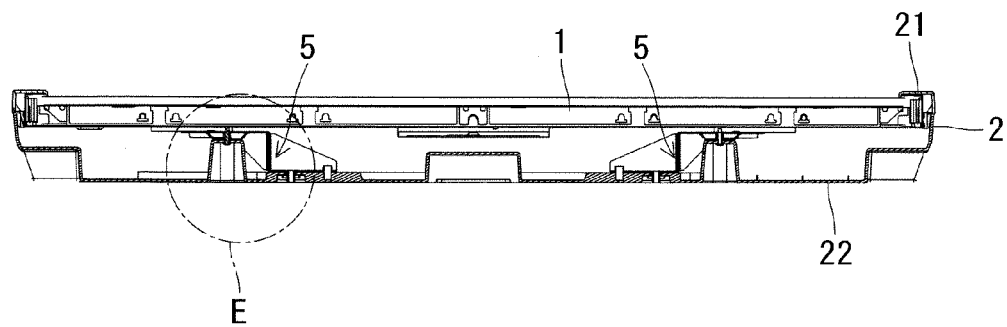
FIG. 11 illustrates a cross sectional view of the display device along a lines C-C shown in FIG. 3.

Referring also to FIGS. 9 and 10, to the first flat portion (51) and the third flat portion (53), a pair of first reinforcement component (54) extending vertically with respect to the portions (51, 53) are connected. Similarly, to the second flat portion (52) and the third flat portion (53), a pair of second reinforcement component (55) extending vertically to the portions (52, 53) are connected. The pair of first reinforcement components (54) and the pair of second reinforcement components (55) can strengthen supportive function of the connecting component (5).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

For example, according to the above-described display device, in each of the mounting units (4) which are provided in two places of the inner surface of second cabinet component (2b), a receive sensor (41) and a information acquisition sensor (42) are attached removable so that the attaching position of the sensor can be changed easily. Thus, depending on the location or usage of the display device, the attaching position of the sensors (41) (42) can be changed. One example may be attaching receiving sensor (41) in the upper mounting units (4) and attaching information acquisition sensor (42) in the lower mounting units (4). Another example may be attaching receiving sensor (41) and information acquisition sensor (42) in both of the upper and the lower mounting units (4).

In the above-described implementation, the cabinet (2) includes the cabinet components (2a, 2b). The cabinet components (2a, 2b) may be formed by the resin material having high flame resistance. The high flame resistance resin is difficult to ignite and reduces the possibility of fire spreading. On the other hand, the high flame resistance resin may reduce weather resistance and/or stain resistance. In one implementation, the outer surface of the cabinet component (2a, 2b) (e.g., the outer surface of cabinet (2)) of the display device of the instant application may be covered by a coating layer having high weather and stain resistance compared to the weather and stain resistance of the cabinet (2). Accordingly, even when the display device is exposed to UV light and/or to an environment including an organic solvent, the cabinet (2) can be protected from UV rays and/or organic solvents by the above described coating, thereby reducing the possibility of degradation.

Other implementations are contemplated. For example, as for the connection between the connecting component (5) and the fixing component, various means may be applied instead of the bolt. Similarly, the connection between the connecting component (5) and the LCD panel (1) may be achieved by various means instead of the screwing component (7). Furthermore, the number of the connecting component (5) provided in the above display device is not limited to four.

In the above-described implementation, the ridge portion (6) is formed by bending a part of the first flat portion (51); however, the scope of the instant application is not limited to this. For example, a component which is different from the portion (51) may be provided on the portion (51) as a ridge portion, and this component may function as a spacer. In this scenario, the screw component (7) is screwed to the back portion of the LCD panel (1) penetrating the back wall (22) of the cabinet (2), the connecting component, (5) and the spacer.

In the above-described implementation, the mounting units (4) are provided on two places on the inner surface of the cabinet (2), and the sensors are attached on both of the mounting units (4); however, the scope of the instant application is not limited to this. For example, only one of the mounting units (4) may have the receiving sensor (41) and the information acquisition sensor (42) attached thereto. For another example, the mounting units (4) may be provided on three or more places. In such scenario, the sensor (41) or (42) may be attached on the one or more mounting units selected among these mounting units (4).

In the above-described implementation, a pair of protruding portions (3) formed on the bottom surface of the cabinet (2) is extended forward from the bottom edge (22a) of the back wall (22) of the cabinet (2); however, the scope of the instant application is not limited to this. For example, the pair of protruding portions (3) may be provided only at the lower edge (22a) of the back wall (22) or its vicinity. In this scenario, the bottom edge (21a) of the front wall (21) of the cabinet (2) and the tip of the each of the protruding portions (3) may be arranged separately in a distance substantially same as the thickness of the cabinet (2), and they align on a single plane perpendicular to the vertical direction (91) of the cabinet (2). Thus, according to this structure, when the display device is in a standing position, the display device is supported on a horizontal surface by the portion (21a) and the pair of the protruding portions (3). As a result, the display device can stand still in a horizontal surface by a relatively small power support.

For another example, the above described structures may be applied not only to the display device having the LCD panel (1), but also to the display device having a plasma display panel, OLED display panel, or Electro-Luminescence panels, etc.

Other implementations are contemplated.

What is claimed is:

1. A display device comprising: a display panel; a cabinet configured to house the display panel; a spacer disposed inside of the cabinet between a back wall of the cabinet and a back portion of the display panel; a fastening component configured to secure the back wall of the cabinet to the back portion of the display panel by penetrating through the back wall of the cabinet and the spacer and resting in an aperture provided in the back portion of the display panel; and a connecting component disposed between the back wall of the cabinet and the back portion of the display panel, wherein: the connecting component includes: a first flat portion provided along the back portion of the display panel; a second flat portion provided along the back wall of the cabinet; and a third flat portion extending perpendicular to the first and second flat portions and connecting the first flat portion to the second flat portion, the display device is configured to be connected to a fixing component coupled to a wall, the spacer is formed on the first flat portion and raised toward the back wall of the cabinet, the spacer includes a penetrating hole for receiving the fastening component, the second flat portion is configured to secure the connecting component to the fixing component, and the second flat portion includes a female fastening component configured to be inserted into a penetrating hole provided on the back wall of the cabinet and receive a male fastening component.

2. The display device of the claim 1, wherein:
the fastening component includes a screw component,
the female fastening component includes a female screw component,
the male fastening component includes a bolt, and
the spacer includes a ridge portion formed on the first flat portion.

3. The display device of the claim 2, wherein the ridge portion is formed by bending a part of the connecting component.

4. A display device comprising:
a display panel;
a cabinet configured to house the display panel;
a connecting component disposed inside the cabinet between a back wall of the cabinet and a back portion of the display panel and including:
 a first portion provided along the back portion of the display panel,
 a spacer formed on the first portion and raised toward the back wall of the cabinet, the spacer including a penetrating hole,
 a second portion provided along the back wall of the cabinet and including a female screw component, and
 a third portion connecting the first portion to the second portion;
a fastening component configured to secure the back wall of the cabinet to the back portion of the display panel by penetrating through the back wall of the cabinet and the penetrating hole of the spacer and resting in an aperture provided in the back portion of the display panel; and
a penetrating hole formed in the back wall of the cabinet and configured to receive the female screw component to enable securing the back wall of the cabinet to a fixing component coupled to a wall.

\* \* \* \* \*